(12) United States Patent
Wendelin

(10) Patent No.: US 6,578,444 B1
(45) Date of Patent: Jun. 17, 2003

(54) VARIABLE END-OF-TRAVEL STOP

(75) Inventor: Thomas Wendelin, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 98 days.

(21) Appl. No.: 09/711,414

(22) Filed: Nov. 13, 2000

(51) Int. Cl.⁷ ............................................... B62D 5/00
(52) U.S. Cl. ........................ 74/495; 180/402; 192/48.2; 192/49; 192/142 R
(58) Field of Search ................... 74/492, 495; 180/402, 180/403, 287; 192/48.2, 48.92, 49, 50, 139, 142 R

(56) References Cited

U.S. PATENT DOCUMENTS

| | | | | |
|---|---|---|---|---|
| 905,912 A | * | 12/1908 | Nehring | 192/223 |
| 1,700,864 A | * | 2/1929 | Tredway | 192/223.3 |
| 1,857,897 A | * | 5/1932 | Vincent | 74/495 |
| 2,075,288 A | * | 3/1937 | Jay | 180/400 |
| 2,598,142 A | * | 5/1952 | Smith | 74/495 |
| 4,558,759 A | * | 12/1985 | Baatrup et al. | 74/495 |
| 4,584,857 A | * | 4/1986 | Weber | 70/184 |
| 6,000,490 A | * | 12/1999 | Easton | 180/402 |

* cited by examiner

Primary Examiner—William C Joyce
(74) Attorney, Agent, or Firm—Edmund P. Anderson

(57) ABSTRACT

A variable end-of-travel stop mechanism, for controlling the rotation of a steering shaft in a steer-by-wire steering system having a controller, includes a first clutch assembly having a first roller clutch engaged to the steering shaft, a first rotary brake engaged to the first roller clutch, and a first electrical connector connected to the first brake and in signal communication with the controller. The first clutch assembly is operative to prevent the rotation of the steering column in a first direction when activated. The stop mechanism further includes a second clutch assembly having a second roller clutch engaged to the steering shaft, a second rotary brake engaged to the second roller clutch and a second electrical connector connected to the second brake and in signal communication with the controller. The second clutch assembly is operative to prevent the rotation of the steering column in a second direction counter to the first direction when activated.

12 Claims, 2 Drawing Sheets

VARIABLE END-OF-TRAVEL STOP

TECHNICAL FIELD

This invention relates to end-of-travel stops in steering systems.

SUMMARY OF THE INVENTION

Disclosed herein is a variable end-of-travel stop mechanism for controlling the rotation of a steering shaft in a steer-by-wire steering system having a controller. The stop mechanism comprises a first clutch assembly including a first roller clutch engaged to the steering shaft, a first rotary brake engaged to the first roller clutch and, a first electrical connector connected to the first brake and in signal communication with the controller. The first clutch assembly is operative to prevent the rotation of the steering column in a first direction when activated. The stop mechanism further comprises a second clutch assembly including, a second roller clutch engaged to the steering shaft, a second rotary brake engaged to the second roller clutch, and a second electrical connector connected to the second brake and in signal communication with the controller. The second clutch assembly operative to prevent the rotation of the steering column in a second direction counter to the first direction when activated.

DESCRIPTION OF THE PREFERRED EMBODIMENT

Figure 1:
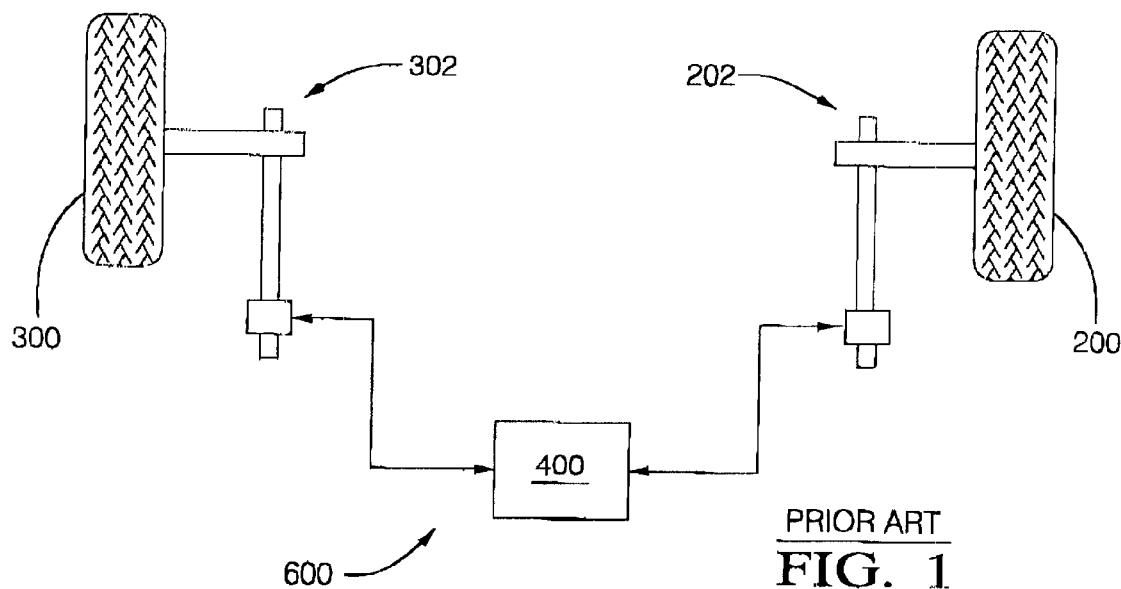
FIG. 1 is a schematic representation of a typical steer-by-wire steering system.
Figure 2:
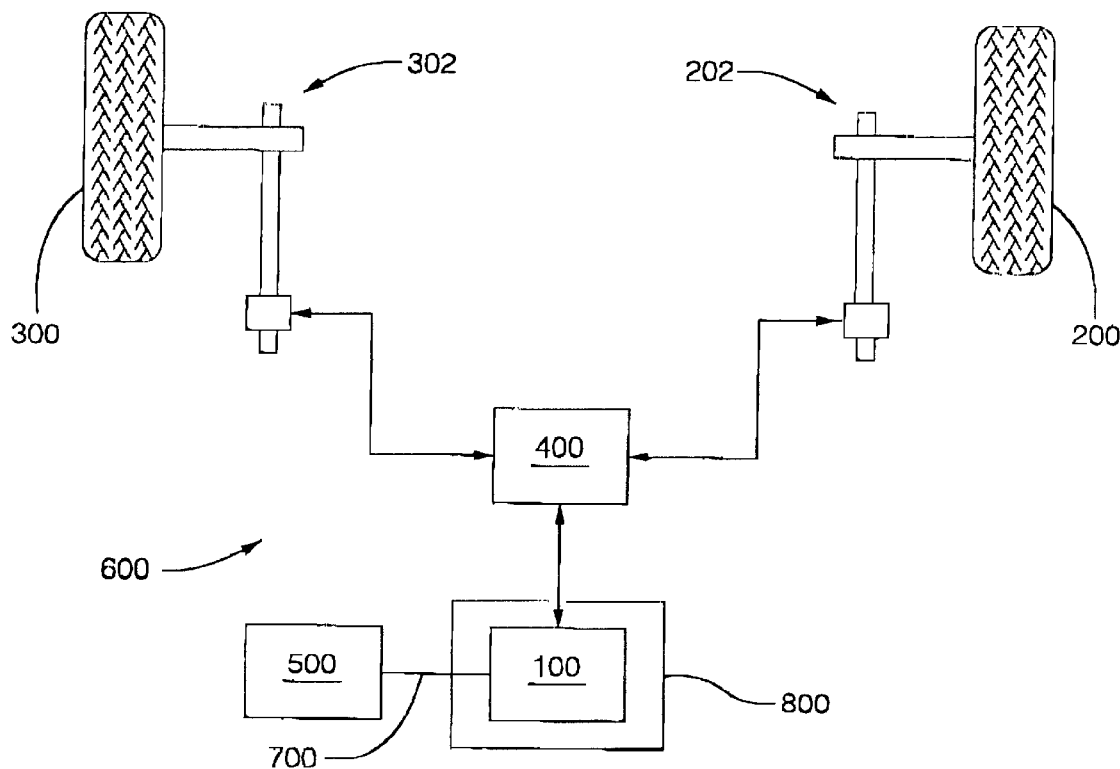
FIG. 2 is a schematic representation of the variable end-of-travel stop mechanism of the present invention in signal communication with the steer-by-wire steering system of FIG. 1.
Figure 3:
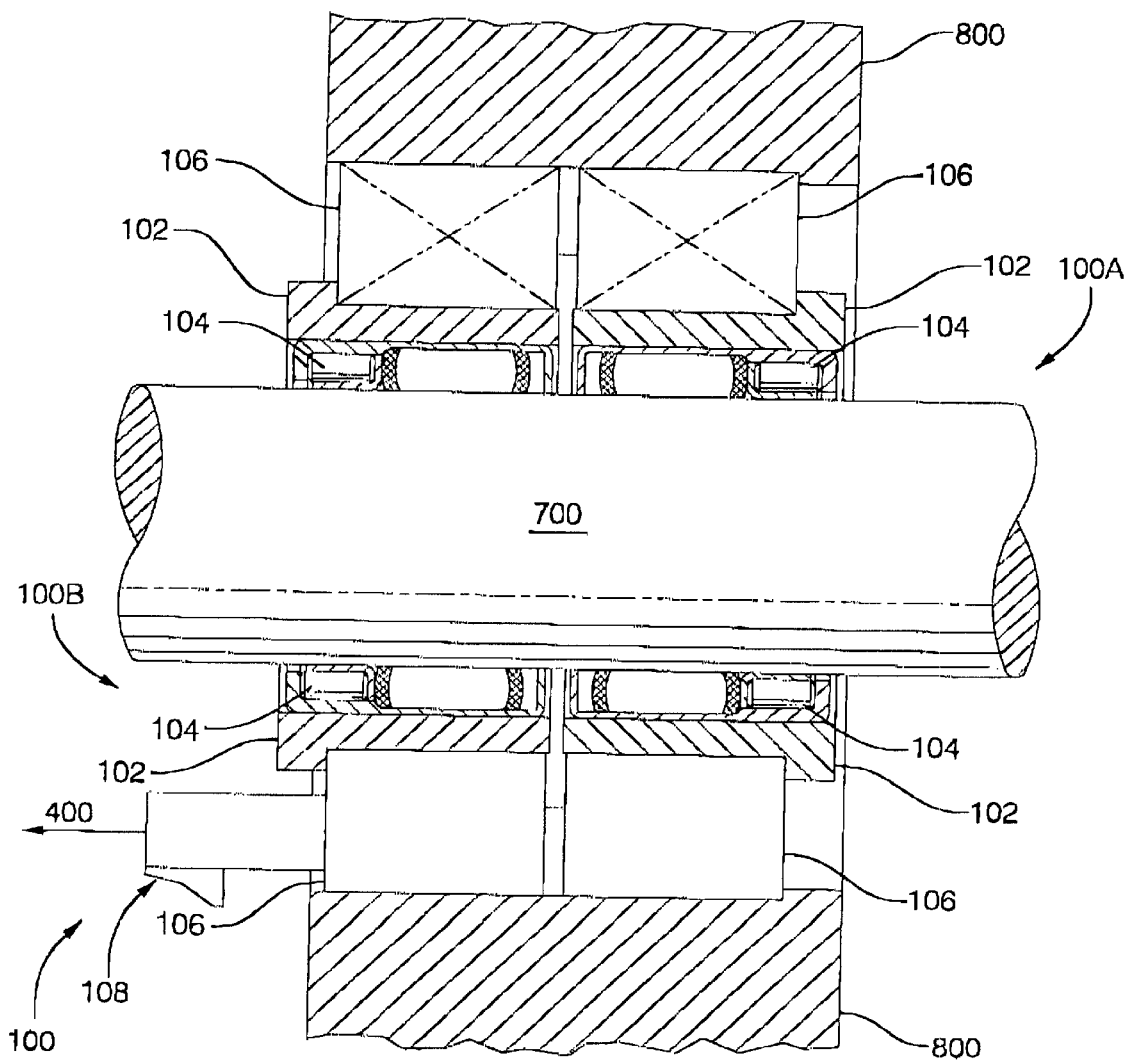
FIG. 3 is a cross sectional view of the variable end-of-travel stop mechanism of the present invention.

A description of the preferred embodiment of the present invention will now be had, by way of exemplification and not limitation, with reference to FIGS. 1, 2, and 3. FIG. 1 is a schematic representation of a typical steer-by-wire steering system 600 as it is generally comprised of a controller 400, a first electro-mechanical actuator 202 and a second electro-mechanical actuator 302, each in signal communication with the controller 400. The first and second electro-mechanical actuators 202, 302 are in turn connected respectively to a first wheel 200 and a second wheel 300 and are operative to turn the wheels 200, 300 under the command of the controller 400.

FIG. 2 is a schematic representation of the variable end-of-travel stop mechanism 100 of the present invention in signal communication with the controller 400 of the steer-by-wire steering system 600 of FIG. 1. As can be seen from FIG. 2, the variable end-of-travel stop mechanism 100 is part of a handwheel module 800 and is in mechanical communication with an external motive source 500, such as a driver by way of a steering shaft 700.

Referring now to FIG. 3, therein depicted is a cross sectional view of the variable end-of-travel stop mechanism 100 of the present invention. As seen in FIG. 3, the variable end-of-travel stop mechanism 100 comprises a first and second clutch assembly 100a, 100b including a pair of roller clutches 102, engaged to a steering shaft 700 by way of optional roller bearings 104. The variable end-of-travel stop mechanism 100 further comprises a pair of rotary brakes 106. Each of the pair of rotary brakes 106 is engaged firstly in a one-to-one relation to each of the pair of roller clutches 102 and secondly to the handwheel module 800. The variable end-of-travel stop mechanism 100 further comprises a pair of electrical connectors 108 connected firstly in a one-to-one relation to each of the pair of rotary brakes 106 and secondly to the controller 400.

As best understood from FIG. 3, the operative nature of the variable end-of-travel stop mechanism 100 is as follows. Each roller clutch 102 is uni-directional in nature such that rotation of the shaft 700 may be arrested in a first direction while allowing unrestricted rotation in a second direction opposite the first direction. In particular, the pair of clutches 102 are juxtaposed counter to one another on the steering shaft 700 so as to allow the free rotation of the steering shaft 700 in a clockwise or counterclockwise direction under normal operating conditions. However, to stop the rotation of the steering shaft 700 in a first direction when the end-of-travel of either the first or second wheel 200, 300 is reached, the controller 400 directs a steering signal, when the aforesaid end-of-travel is sensed, to an appropriate one of the pair of rotary brakes 106, via the corresponding electrical connector 108 so as to engage that rotary brake 106. Such engagement locks that rotary brake 106 and the corresponding roller clutch 102 to the handwheel module 800 thus preventing any further rotation of the steering shaft 700 in the first direction. If the driver 500 rotates the steering shaft 700 in a second direction, opposite the first direction, no feeling of resistance to that rotation is experienced because the locked roller clutch 102 is always free to rotate in the opposite rotational direction. It should be understood from FIG. 3 and the above description of the operative nature of the end-of-travel mechanism 100, that a mirror image of the above locking arrangement is accomplished if the driver 500 reaches end-of-travel of the first or second wheel 200, 300 in the second direction, opposite the first direction.

The invention is also useful for locking the steering shaft when the engine is shut off, which is easily accomplished by sending locking signals to both clutches.

Changes and modifications can be made by those skilled in the art to the embodiments as disclosed herein and such examples, illustrations, and theories are for explanatory purposes and are not intended to limit the scope of the claims.

What is claimed is:

1. A variable end-of-travel stop apparatus for controlling rotation of a steering shaft, said apparatus comprising:

a controller;

first braking means for braking the rotation of said steering shaft in a first direction in response to a signal from said controller, said first braking means including a first clutch assembly having a first roller clutch engaged to the steering shaft, a first rotary brake engaged to the first roller clutch, a first electrical connector connected to the first rotary brake and in signal communication with the controller, the first clutch assembly operative to prevent the rotation of the steering shaft in the first direction when activated; and second braking means for braking the rotation of the steering shaft in a second direction in response to a signal from said controller.

2. The apparatus of claim 1 further wherein:
said second braking means further comprises:
a second clutch assembly including:
a second roller clutch engaged to the steering shaft;
a second rotary brake engaged to the second roller clutch; and
a second electrical connector connected to the second brake
and in signal communication with the controller; and
said second clutch assembly operative to prevent the rotation of the steering shaft in the second direction counter to the first direction when activated.

3. A variable end-of-travel stop apparatus for controlling rotation of a steering shaft, said apparatus comprising:
a controller;
a first clutch assembly for braking the rotation of said steering shaft in a first direction in response to a signal from said controller, said first clutch assembly including a first roller clutch engaged to the steering shaft and a first rotary brake positioned in association with the first roller clutch; and,
a second clutch assembly for braking the rotation of said steering shaft in a second direction, opposite the first direction, in response to a signal from said controller, said second clutch assembly including a second roller clutch, separate from the first roller clutch, engaged to the steering shaft and a second rotary brake positioned in association with the second roller clutch.

4. The apparatus of claim 3 wherein the first rotary brake is concentrically arranged about the first roller clutch and the second rotary brake is concentrically arranged about the second roller clutch.

5. The apparatus of claim 3 further comprising a first electrical connector connected to the first rotary brake and in signal communication with the controller and a second electrical connector connected to the second rotary brake and in signal communication with the controller.

6. The apparatus of claim 3 wherein the first roller clutch and the second roller clutch include a plurality of roller bearings for engaging the first roller clutch and the second roller clutch to the steering shaft.

7. A steer by wire steering system comprising:
a steering shaft;
a controller; and,
a variable end-of-travel stop mechanism including a first clutch assembly for braking the rotation of said steering shaft in a first direction in response to a signal from said controller, said first clutch assembly including a first roller clutch engaged to the steering shaft and a first rotary brake positioned in association with the first roller clutch, and, a second clutch assembly for braking the rotation of said steering shaft in a second direction, opposite the first direction, in response to a signal from said controller, said second clutch assembly including a second roller clutch, separate from the first roller clutch, engaged to the steering shaft and a second rotary brake positioned in association with the second roller clutch.

8. The steering system of claim 7 wherein the first rotary brake is concentrically arranged about the first roller clutch and the second rotary brake is concentrically arranged about the second roller clutch.

9. The steering system of claim 7 further comprising a first electrical connector connected to the first rotary brake and in signal communication with the controller and a second electrical connector connected to the second rotary brake and in signal communication with the controller.

10. The steering system of claim 9 further comprising a first wheel and a second wheel, and further wherein, when end-of-travel of one of the first wheel and the second wheel is reached, the controller directs a steering signal to one of the first rotary brake and second rotary brake via one of the first electrical connector and second electrical connector, respectively.

11. The steering system of claim 7 wherein the first roller clutch and the second roller clutch include a plurality of roller bearings for engaging the first roller clutch and the second roller clutch to the steering shaft.

12. The steering system of claim 7 further comprising first and second electro mechanical actuators in signal communication with the controller.

\* \* \* \* \*